United States Patent
Crosby et al.

(10) Patent No.: US 7,603,461 B2
(45) Date of Patent: Oct. 13, 2009

(54) METHODS, APPARATUS, AND SYSTEMS FOR DISTRIBUTED HYPOTHESIS TESTING IN AUTONOMIC PROCESSING MACHINES

(75) Inventors: Simon Crosby, San Francisco, CA (US); John Mark Agosta, Palo Alto, CA (US); Denver Dash, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 695 days.

(21) Appl. No.: 11/172,438

(22) Filed: Jun. 29, 2005

(65) Prior Publication Data

US 2007/0005753 A1    Jan. 4, 2007

(51) Int. Cl.
*G06F 15/173* (2006.01)
*G06F 11/00* (2006.01)

(52) U.S. Cl. .......................... 709/224; 726/23
(58) Field of Classification Search .............. None
See application file for complete search history.

(56) References Cited

U.S. PATENT DOCUMENTS

| | | | |
|---|---|---|---|
| 6,609,205 B1 * | 8/2003 | Bernhard et al. | 726/22 |
| 2005/0188215 A1 * | 8/2005 | Shulman et al. | 713/188 |
| 2006/0021054 A1 * | 1/2006 | Costa et al. | 726/25 |
| 2006/0095963 A1 | 5/2006 | Crosby et al. | |
| 2006/0095970 A1 * | 5/2006 | Rajagopal et al. | 726/25 |
| 2006/0161984 A1 * | 7/2006 | Phillips et al. | 726/24 |
| 2006/0242705 A1 * | 10/2006 | Sadhasivam et al. | 726/23 |
| 2006/0294588 A1 * | 12/2006 | Lahann et al. | 726/23 |

OTHER PUBLICATIONS

Jung, J., et al., "Fast Portscan Detection Using Sequential Hypothesis Testing", [online]. [archived Mar. 27, 2003]. Retrieved from the Internet: <URL:http://web.archive.org/web/20040327005835/http://nms.lcs.mit.edu/papers/portscan-oakland04.pdf>, (2004), 1-15.

Weaver, N., et al., "Very Fast Containment of Scanning Worms", *Proceedings of the 13th USENIX Security Symposium*, (Aug. 9-13, 2004, San Diego, CA), (2004), 17 pgs.

* cited by examiner

*Primary Examiner*—Patrice Winder
*Assistant Examiner*—Minh-Chau Nguyen
(74) *Attorney, Agent, or Firm*—Schwegman, Lundberg & Woessner, P.A.

(57) ABSTRACT

Methods, apparatus, and systems are provided for distributed hypothesis testing in autonomic processing machines. Evidence about a network resource is gathered or contributed to and associated with a hypothesis about the network resource. The evidence is processed to determine whether a decision can be made with respect to activities or problems associated with the network resource. The hypothesis, the evidence, and the contributed evidence are propagated over a network to other network nodes or participants.

23 Claims, 8 Drawing Sheets

| | | ATTACK | | |
|---|---|---|---|---|
| | | POSITIVE | NEGATIVE | |
| TEST | POSITIVE | TRUE POSITIVE (TP) | FALSE POSITIVE (FP) | TP+ FP |
| | NEGATIVE | FALSE NEGATIVE (FN) | TRUE NEGATIVE (TN) | FN + TN |
| | | TP + FN | FP +TN | |

- SENSITIVITY = TP / TP+FN: THE PORTION OF ATTACKED SYSTEMS THAT ARE CORRECTLY IDENTIFIED BY A POSTIVE RESULT ("TRUE POSTIVE RATE")
- SENSITIVITY = TN / TN+FP: THE PORTION OF HEALTHY SYSTEMS THAT CORRECTLY IDENTIFIIED BY A NEGATIVE TEST RESULT ("TRUE NEGATIVE RATE")
- POSTIVE PREDICTIVE VALUE (PPV) = TP / TP+FP
- NEGATIVE PREDICTIVE VALUE (NPV) = TN / FN+TN

|  |  | ATTACK | | |
|---|---|---|---|---|
|  |  | POSITIVE | NEGATIVE |  |
| TEST | POSITIVE | TRUE POSITIVE (TP) | FALSE POSITIVE (FP) | TP+ FP |
| TEST | NEGATIVE | FALSE NEGATIVE (FN) | TRUE NEGATIVE (TN) | FN + TN |
|  |  | TP + FN | FP + TN |  |

- SENSITIVITY = TP / TP+FN: THE PORTION OF ATTACKED SYSTEMS THAT ARE CORRECTLY IDENTIFIED BY A POSTIVE RESULT ("TRUE POSTIVE RATE")
- SENSITIVITY = TN / TN+FP: THE PORTION OF HEALTHY SYSTEMS THAT CORRECTLY IDENTIFIED BY A NEGATIVE TEST RESULT ("TRUE NEGATIVE RATE")
- POSTIVE PREDICTIVE VALUE (PPV) = TP / TP+FP
- NEGATIVE PREDICTIVE VALUE (NPV) = TN / FN+TN

METHODS, APPARATUS, AND SYSTEMS FOR DISTRIBUTED HYPOTHESIS TESTING IN AUTONOMIC PROCESSING MACHINES

TECHNICAL FIELD

The teachings presented herein relate to data processing and more particularly to autonomic hypothesis testing and autonomic response for problems with and/or attacks levied against processing machines.

BACKGROUND INFORMATION

Networks are increasingly coming under attacks from malicious applications, services, or users. To alleviate these attacks and minimize the effects of their propagation, a variety of techniques have been developed that permit nodes of a network to communicate with one another for purposes of determining when the network believes it is under attack.

One technique relies on a detector at a network node to determine locally, based on collected evidence, whether given events occurring within the network node are consistent with an attack. If such a situation is detected, then the network address associated with the alleged attacker can be blocked. The technique executes when an Internet Protocol (IP) address attempts a connection with the network node. It is somewhat expensive in terms of processing and memory because each unique IP address has to be managed and each connection or each failed connection attempt has to be managed.

Another technique modifies the first technique by using a mechanism to maintain a counter that is incremented on attempted connections to the network node and decremented when a connection is successfully acknowledged. This can help ensure that a given IP address stays below a given threshold of allowable connection attempts to the network node. However, response by throttling or quarantining of network nodes, with this particular heuristic approach, can cause a meltdown of the network because of the approach's false positive rate.

DESCRIPTION OF EMBODIMENTS

Figure 1:
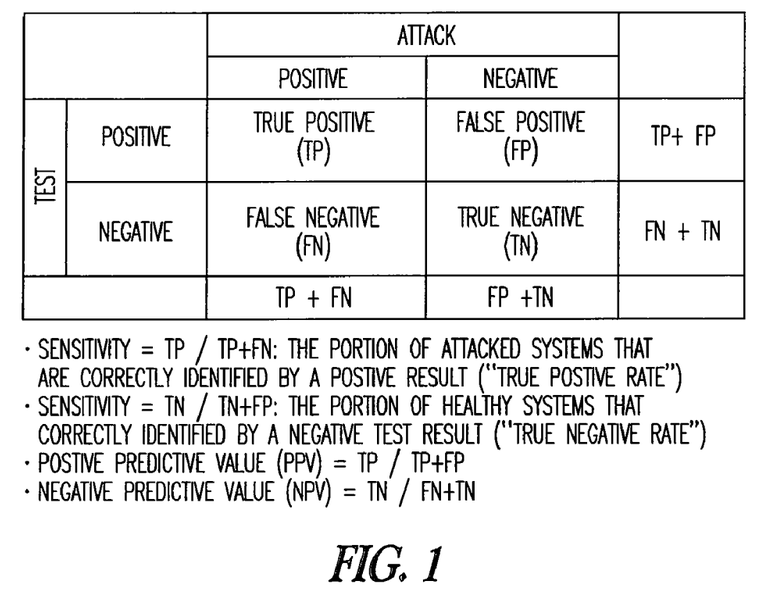
FIG. 1 is a diagram depicting values associated with assessing the validity of an attack, according to an example embodiment.

FIG. 1 is a diagram depicting values associated with assessing the validity of an attack, according to an example embodiment. FIG. 1 graphically depicts a confusion matrix. The confusion matrix represents properties or an accuracy profile associated with a given detector; the accuracy profile identifies how accurate the detector is in identifying attackers.

A detector may be viewed as a network node or a network participant. In an embodiment, the detector and its processing are implemented in a network host, switchers, or routers for a given local set of processing devices that communicate over a network. The network may be wired, wireless, or a combination of wired and wireless.

The terms and phrases: "node, "detector," and "network participant" may be used synonymously herein. A detector appears to its peers or other detectors over the network in terms or its identity, its current state, and its confusion matrix.

The confusion matrix is a small table of four quantities that convey properties of a given detector to which it is associated in terms of that detector's ability to detect an attack or problem with another network resource. A network resource may be a service, an application, a system, a user, a device, etc. The detector perceives actions taken by a network resource as a problem or an attack. A problem may be related to performance or a failure. An attack is malicious activity such as the propagation of a virus (e.g., worm, etc.).

The elements of the confusion matrix depicted in FIG. 1 are fractions of True Positives (TP), False Positives (FP), True Negatives (TN), and False Negatives (FN). The confusion matrix may be determined from a point on a Receiver Operation Characteristic (ROC) curve via thresholds. The detector is associated with the confusion matrix. The detector receives events associated with a network resource, and the actions or operations it takes with respect to evaluating those operations provides a profile or characteristic about the accuracy of the detector in correctly or incorrectly identifying attacks or problems.

From the confusion matrix a variety of performance or accuracy profiles may be developed for a given detector. For example, the Sensitivity of the detector may be defined as the proportion of attacked or problem systems or services that are correctly identified by a positive detection result. A detector's Sensitivity=$TP/(TP+FN)$. In a similar manner, a detector's Specificity is the proportion of healthy systems correctly identified by a negative detection result (e.g., a TN). Specificity=$TN/(TN+FP)$. The accuracy for a detector in predicting TP's is called its Positive Predictive Value (PPV). PPV=$TP/(TP+FP)$. The accuracy for a detector in predicting TN's is called its Negative Predictive Value (NPV). NPV=$TN/(FN+TN)$.

A detector's confusion matrix may be used as a profile by other detectors on the network to provide a weight to the assertions made by the detector associated with the confusion matrix about a hypothesis. In an embodiment, if a detector has good Sensitivity and Specificity values for its confusion matrix, then other nodes will provide more weight to evidence propagated by such a detector.

A hypothesis is a message generated by a detector to be corroborated by events detected within the local environment of the detector either internal to the environment, or for an external network resource. The message is defined as {A: {L, E}}, where L is the identity of the detector or node forming the hypothesis, A is the identity of the network resource or hypothetical attacker or problem resource, and E is the local evidence on L about the problem associated with A.

Any given node or detector on a network may generate its own hypotheses, or it may be the recipient of a propagated hypothesis. If a node (L) is a recipient of a propagated hypothesis (hereinafter "H"), then L may add its own locally derived or detected evidence (E) to the message associated with the H.

Evidence may assume three values within a message vector associated with a H. Positive evidence confirms a hypothesis (A is a problem or an attacker). Negative evidence contradicts a hypothesis (A is not a problem and is not an attacker). The final value for evidence is no evidence at all. Here, L can neither support nor contradict the hypothesis (e.g., L may not have had any communication with A). In an embodiment, positive evidence may be represented by a numeric value of 1 within the hypothesis; negative evidence may be represented by a numeric value of -1; and no evidence may be represented by the value of 0.

Thus, a node generating its own H from positive evidence of a locally detected event forms the message {A: {L, E}}, incorporating its evidence into H. The node then propagates H over the network to the other nodes with which it is in communication. In an embodiment, the propagation may be achieved with a gossip protocol. In a gossip protocol propagation scheme, a node randomly selects peer nodes and distributes H to them. If a node receives an H to which it has already contributed evidence, then the H will not be further propagated, or the node may elect to forward H less frequently (depending on parameters associated with the gossip protocol's configuration).

A node that contributes its own locally determined evidence to an existing H produces compound evidence that is concatenated with the message associated with H. For example, if node M receives H, it adds its own local evidence about H as {A: {L, 1} {M, 1}} for positive evidence it collected; {A: {L, 1} {M, -1}} for negative evidence it collected; and {A: {L, 1} {M, 0}} for no evidence that was detectable by M. A given H as it is distributed around the network becomes a time-ordered evidence vector, which identifies each contributing node.

The evidence vector is inspected at each node as it is received for purposes of determining whether further evidence may be contributed to the evidence vector or for purposes of determining whether a given H can be definitively confirmed or denied. This process is described with respect to the method 200 depicted in FIG. 2.

Figure 2:
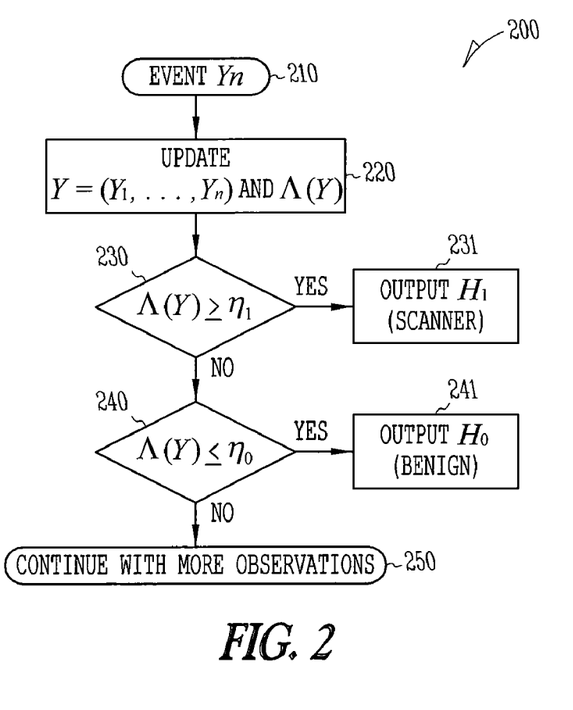
FIG. 2 is a diagram of method processed by a node to assess a perceived problem with a resource, according to an example embodiment.

FIG. 2 is a diagram of method 200 processed by a node to assess a perceived problem with a resource, according to an example embodiment. The method 200 (herein after "problem testing service") is implemented in a machine-accessible and readable medium and is operational over a network. The problem testing service represents the processing taken at a single network node with respect to contributing to a distributed or propagated H; and with respect to testing a problem or hypothesis for purposes of confirming or denying the problem or hypothesis at a given network node.

Initially, the problem testing service receives an H represented as an evidence vector from another node over a network. At 210, the problem testing service, which is processing on a given node as a detector, inspects or looks for an event and forms a piece of evidence E (e.g. $Y_n = \{L, 1\}$) with respect to the H for a given network resource A.

At 220, the problem testing service updates the evidence vector (Y) for H including $Y_n$. Next, at 230, the problem testing service may use one of two techniques to decide whether H can now be confirmed as true or denied as false.

In the first approach, an approximation is used in cases where each piece of positive evidence in Y is of equal importance and weight as each piece of negative evidence. The second approach deals with positive evidence that is not equal in magnitude to negative evidence and with evidence, both positive and negative that may vary in magnitude. Each of these will now be discussed in turn.

With the first approach, let J be the summation over the sequence of n votes (evidence entries in the evidence vector Y), where each entry is one of: -1 (negative), 0 (no evidence), and 1 (positive evidence); and summed by starting at the first piece of evidence (e.g., the initial 1 provided by the root node or node that generated the H) and continuing for n iterations. After the problem testing service has added its piece of evidence (assume this to be represented in Y at the $n^{th}$ location), the value of J ($J_n$) is the position of a counter relative to the starting position. That is, $J_n$ is the summation of evidence values from $Y_1$ to $Y_n$. In other words, $J_n$ is the partial sum of the counter after the problem testing service adds the $n^{th}$ piece of evidence to H.

At this point in the first approach, a Threshold Random Walk (TRW) algorithm may be used to determine the likelihood of the evidence vector Y ($\Lambda(Y)$), such that if $\Lambda(Y)$ is greater than a predefined and determined threshold η, then the H under analysis can be confirmed. That is, the probability of H being legitimate can be gauged by comparing $\Lambda(Y)$ to see if it is greater than or equal to $\eta_1$. For example, after 10 added pieces of evidence Y may appear as {1, 0, 1, -1, -1, 0, 0, 0, 1, 1}. Here, the problem testing service added the $10^{th}$ piece of evidence at location i=10. The summation (J) is 2. At any point in the summation $\Lambda(Y)$ is assumed to be a stopping condition if the counter strays beyond either an upper ($\eta_1$) or lower threshold ($\eta_0$). The thresholds are computed in response to probabilistic arguments used with the TRW algorithm. As was mentioned the first approach assumes that each piece of positive evidence (1) is equal in weight to each pieces of negative evidence (-1). If this is not the case, then a second approach is used.

In the second approach, the problem testing service computes the likelihood of Y (evidence vector), using probabilistic arguments that derive from the confusion matrix. That is, the problem testing service computes the probability of the evidence using the equation:

$$\Lambda(Y) = \frac{Pr[Y|H_1]}{Pr[Y|H_0]} = \prod_{i=1}^{n} \frac{Pr[Y_i|H_1]}{Pr[Y_i|H_0]}$$

Where Y is the evidence vector collected to date by the problem testing service and $H_0$ and $H_1$ are the conditions represented by the "hypothesis is false" and the "hypothesis is true," respectively; and $P_r$ is a probability distribution.

Added complexity with the second approach occurs because each different node contributing to each piece of evidence in Y has a different Sensitivity or Specificity (described above with respect to the confusion matrix of FIG. 1). So, a positive evidence value from a node X is not necessarily equal in weight to a positive evidence value supplied by node Z, and similarly for negative evidence. Nodes X and Z have different confusion matrixes (based on their ROC curves). The different conditional probabilities for the weights given to the evidence for X and Z may be written as:

$$Pr[Y_i=0|H_0]=\theta_0^i;\ Pr[Y_i=1|H_0]=1-\theta_0^i$$

$$Pr[Y_i=0|H_1]=\theta_1^i;\ Pr[Y_i=1|H_1]=1-\theta_1^i$$

Thus, the evidence weight applied to Y is dependent on the identities of the nodes that contributed the individual pieces of evidence. In an embodiment, each node's confusion matrix is known to the other nodes by maintaining a table; the table may include manufacturer model numbers for the machines that are associated with each node and a corresponding confusion matrix for each model number of the machines. The mapping of the model numbers to the identities of the nodes may be maintained within each node or alternatively the model numbers, or the confusion matrix values themselves may be added to the evidence vector Y by each contributing node.

At 230, if the likelihood of Y is greater than or equal to an upper threshold, then, at 221, the hypothesis is confirmed (True). In a similar manner, at 240, if the likelihood of Y is less than or equal to a lower threshold, then, at 241, the hypothesis is denied (False). If the likelihood of Y cannot be determined to be True or False, then, at 250, the problem testing service continues to monitor actions associated with a network resource, and propagates its updated evidence vector with respect to H to other nodes of the network.

As the evidence vector is circulated through the network, it increases in length, accumulating the contributions of multiple nodes. At any node that receives the vector, it is possible to compute the probability of the evidence, and if the evidence is 'improbable' to sound an alarm. In order to damp the gossip protocol (if used by the problem testing service to propagate Y), two techniques are available: first, no node re-gossips a message to which it has already contributed. As all nodes eventually see (with high probability) any given message, eventually an unsubstantiated hypothesis will eventually die down. However, there can also be (based on knowledge of the attack or problem style, perhaps) assigned a maximum lifetime for which evidence is considered valid. A hypothesis which remains un-corroborated after a maximum timeout T is considered invalid, and further propagation of the hypothesis is halted. Alternatively, it may be stipulated that if evidence to support the hypothesis had increased after time T, then the hypothesis is continued for another T units of time, otherwise it is considered uncorroborated, and dropped.

In an embodiment, where a gossip protocol is used to propagate the message vector and its associated hypothesis, it is likely that as evidence is gossipped around the network, that a given node (say M) receives two different evidence vectors (which result from the branching process of a widespread propagation) at any one time. This is illustrated in FIG. 3. Merging evidence from multiple node sources is considered to be of benefit, and gives the protocol acceleration relative to normal gossip. The merging process is straightforward, assuming that the identities of the nodes are included in the evidence vector. The vectors are merged based on a time ordering, with simultaneous entries becoming arbitrarily ordered, since they are obviously unrelated. The merged evidence vector has more value than the shorter original vectors, and it is forwarded according to the principles of gossip described above.

In still another embodiment, it is possible in a growing attack or growing problem that multiple nodes issue the same or slightly different hypotheses about the nature/origin of the attack. It is therefore beneficial to reduce the consumption of bandwidth for redundant hypotheses, and moreover to use the propagation technique to help refine the hypotheses as they circulate. For example, A hypothesis A is a statement about the belief of the identity of the attacker, drawn from the observations of a local node. The identity of the attacker takes the form of an IP prefix, where a.b.c.d/n denotes an IP address and a mask applied to that address. The mask is of length n, where n=32 indicates precision to the level of an individual address a.b.c.d, and n=28 indicates precision to within 4 bits, or a possible 16 candidates for the attacker A. Assume two hypotheses {a.b.c.d/28: E} and {a.b.c.d/30: E'} are both received in the same time frame at some node A. Here E and E' are evidence vectors that will differ, depending on the nodes visited by the two hypotheses en route to A. Node A may then merge the hypotheses: The new hypothesis is {a.b.c.d/30: E''}. It gains the precision from the 'narrower' hypothesis, and E'' is formed from the time-ordered merge of E and E'. This may not be probabilistically sound, but offers (on the assumption that no two independently inaccurate hypotheses about the same region of IP address space would be likely to simultaneously arise, given uniform prior activity over the IP address space) a way to both home in on the true identity of the attacker or problem by increasing the mask length n, and a way to make the evidence more compelling, by combining all evidence seen to date. The revised hypothesis is forwarded, as is the original weaker hypothesis {a.b.c.d/28: E} and its evidence.

In yet another embodiment, if at any node on the sequence of nodes visited by a gossip protocol, the evidence is found to be sufficiently compelling, an alarm will be raised. That is, the node will conclude that the evidence vector is compelling enough to sound the alarm over the hypothesis (the hypothesis is true). Given that the computation of the quantity $\Lambda(Y)$ is identical at each node, the hypothesis would be found to be true at all nodes, given the same evidence. The node therefore suspends propagation of evidence, and changes the message to be {A: M, TRUE}, where M is the identity of the node sounding the alarm, and A is the hypothesis, as before. This is circulated as a new gossip, and is used also to trigger any 'global responses' that a system might have to counter the attack. A node receiving a TRUE hypothesis propagates it more aggressively than it would propagate normal evidence-gathering messages, and in addition discards any future hypotheses that are equal to A (attacker or problem resource). The hypothesis may still be refined as described above.

Similarly, it may occur that the problem testing service can (uniquely) show that a hypothesis and the evidence collected to date is definitely FALSE. A node that decides that the hypothesis is FALSE (a) halts gossip of the hypothesis, and then sequentially contacts the nodes that have contributed evidence to the hypothesis thus far, to inform them of its decision. The most beneficial node to inform is the root node (originator) of the hypothesis, which might have taken local countermeasures in anticipation of the fact that its hypothesis would be confirmed TRUE (for example by rate limiting all traffic to or from the presumed attacker or problem resource A).

It is noted that the resource (attacker or problem system, application, user, service, etc.) may not be external to the node associated with the problem testing service. That is, an application or user within the local environment of the problem testing service may be using the node to propagate a problem to other nodes on the network. Hence, the event that initiates the problem hypothesis may be internal to the local environment. However, it is also possible for the resource to be remote from the local environment of the problem testing service.

Additionally, the events detected to formulate evidence do not have to be limited to attacks such as propagation of viruses. For example, the events may be related to faults, performance issues, configuration issues, security issues, and the like.

Furthermore, in detecting events the problem testing service is capable of identifying attributes about the nature of the attack or problem, for example, the suspected remote attacker's IP address, or the IP prefix within which the remote attacker is located. These attributes are nothing more than "probabilistic facts"—that is, they are hypotheses until they are proven to be correct. Without loss of generality, assume the problem testing service is capable of forming a hypothesis about the identity of the remote attacker, for example by identifying it concretely or identifying its IP prefix.

When the problem testing service triggers, e.g. with the belief that the remote resource A is an attacker, the node can effect locally significant autonomic responses to ensure that it is not further compromised by A (or, in the case that the local system is the attacker itself, that it does not continue to attack the other systems attached to the network). One example response would be to rate limit traffic to/from A, until the hypothesis that A is an attacker can be verified.

Although, the processing of the problem testing service was described as being the recipient of a hypothesis, it is noted that the problem testing service may autonomously generate the initial hypothesis that is propagated or distributed about the network. A hypothesis is associated with a message vector that includes pieces of distributed evidence; each instance of the problem testing service that executes on different nodes of the network contributes to the pieces of evidence within the message vector. Also, each node may generate its own locally determined hypothesis and offer it for collaboration to the other remaining nodes of the network. Hence, there may be multiple, independently originated hypothesis messages propagating in the network at any one time. The number of nodes participating in the network is configurable. Evidence is aggregated from the participating nodes and locally evaluated at each node to determine whether to continue to propagate a given hypothesis, start a new hypothesis, or terminate a given hypothesis. This communication is achieved via messages that represent the hypotheses and include the evidence vectors for a given hypothesis.

Some examples of scenarios for distributed hypothesis testing for a given resource are now presented in FIGS. 3A-3D for purposes of illustration.

Figure 3A:
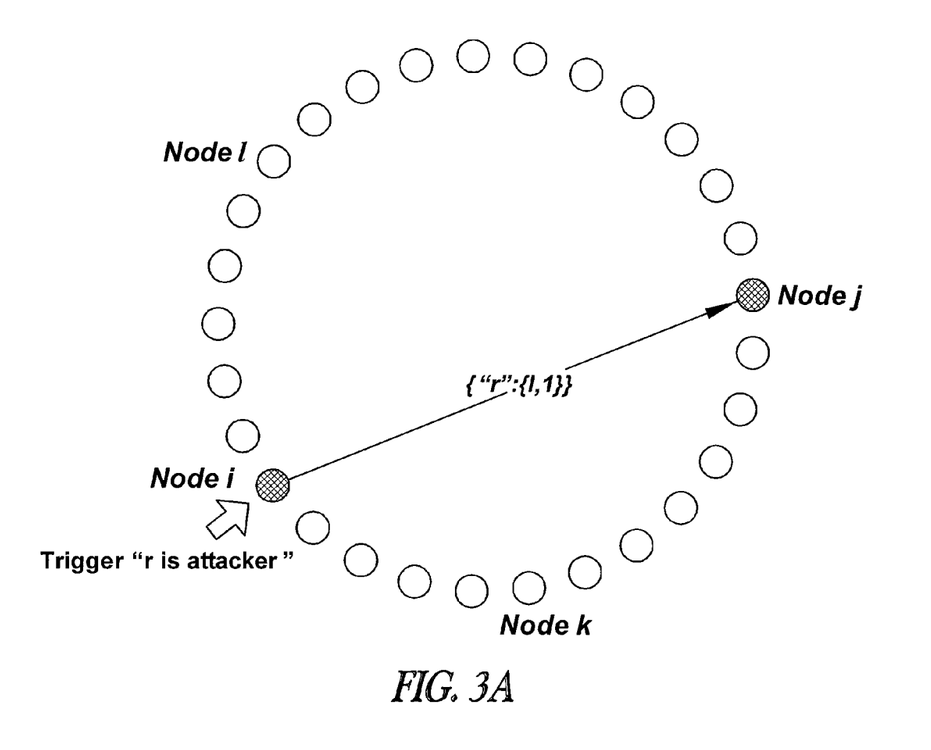
FIG. 3A is a diagram depicting a scenario where a node propagates a new hypothesis about a resource to another network node or participant, according to an example embodiment.

FIG. 3A is a diagram depicting a scenario where a node propagates a new hypothesis about a resource to another network node or participant, according to an example embodiment.

In FIG. 3A Node i identifies a resource r as what it believes to be an attacker. In response i rate-limits traffic from r; forms a hypothesis H, and randomly gossips H and the evidence that i has about the network. Node j receives H and adds its belief about r to the evidence vector Y for H. This process continues about the network, where each node processes a problem testing service, such as the method 200 depicted in FIG. 2.

Figure 3B:
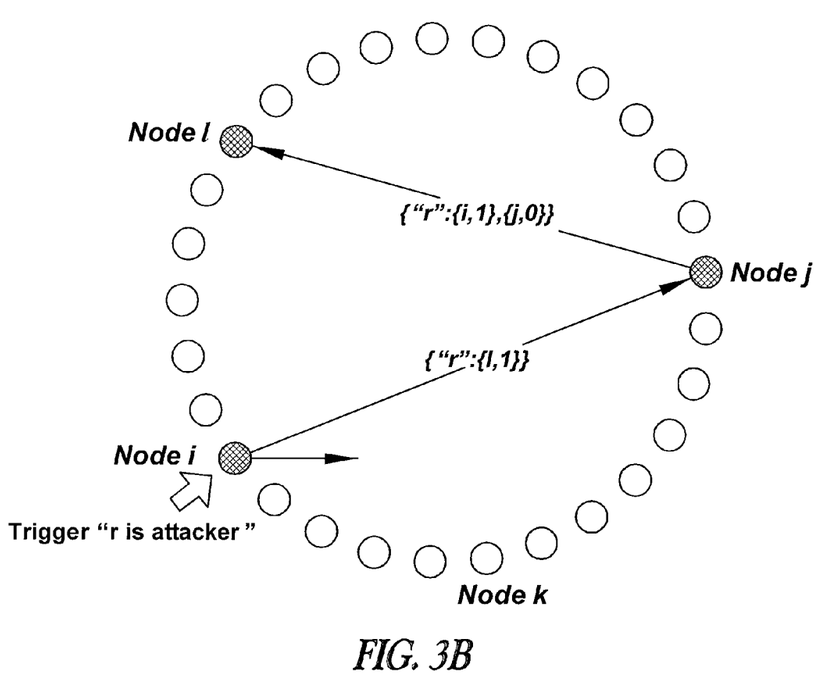
FIG. 3B is a diagram depicting a scenario where a node does not contribute to a hypothesis but propagates the hypothesis to another network node or participant, according to an example embodiment.

FIG. 3B is a diagram depicting a scenario where a node does not contribute to a hypothesis but propagates the hypothesis to another network node or participant, according to an example embodiment.

In FIG. 3B, a scenario is depicted where node j does not have any evidence that is useful to the determination as to whether the attacker r, described in FIG. 3A, is in fact an attacker. In this scenario, no useful evidence is added to Y and node j continues to gossip H and Y about the network. Concurrent to this action, another node I continues to propagate H and Y about the network.

Figure 3C:
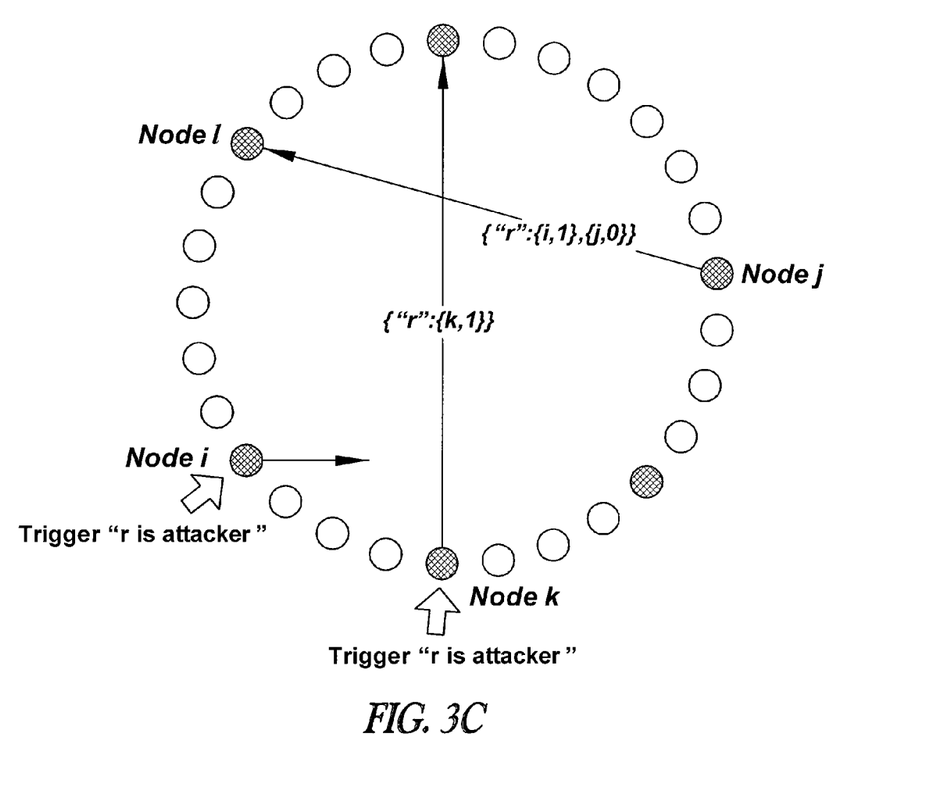
FIG. 3C is a diagram depicting a scenario where a different node forms its own hypothesis about a resource and begins to propagate the duplicate hypothesis to other network nodes or participants, according to an example embodiment.

FIG. 3C is a diagram depicting a scenario where a different node forms its own hypothesis about a resource and begins to propagate the duplicate hypothesis to other network nodes or participants, according to an example embodiment.

In FIG. 3C, as the propagation increases about the network from the scenarios depicted in FIGS. 3A and 3B; a new node k forms its own independent H about r and begins to randomly propagate H and k's evidence about the same network.

Figure 3D:
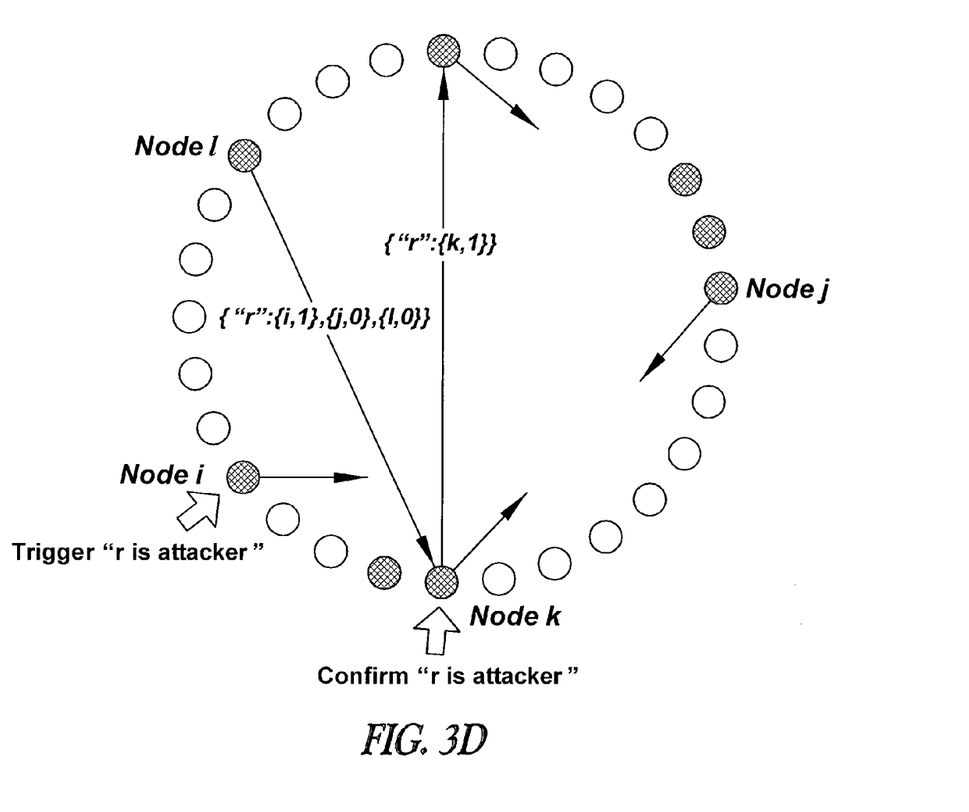
FIG. 3D is a diagram depicting a scenario where one node in a network confirms a propagated hypothesis with respected to a resource, according to an example embodiment.

FIG. 3D is a diagram depicting a scenario where one node in a network confirms a propagated hypothesis with respected to a resource, by merging evidence from two messages, according to an example embodiment.

In FIG. 3D, the original propagation started by node i in FIG. 3A continues until each node of the network receives H. However, in FIG. 3D, node k confirms H and blocks all traffic associated with r. Node k will then accelerate its TRUE determination about H to the nodes of the network.

A variety of other scenarios may exist. FIGS. 3A-3D are presented to illustrate a few scenarios for purposes of comprehension. Thus, embodiments of the invention should not be restricted to just the scenarios presented in FIGS. 3A-3D.

Figure 4:
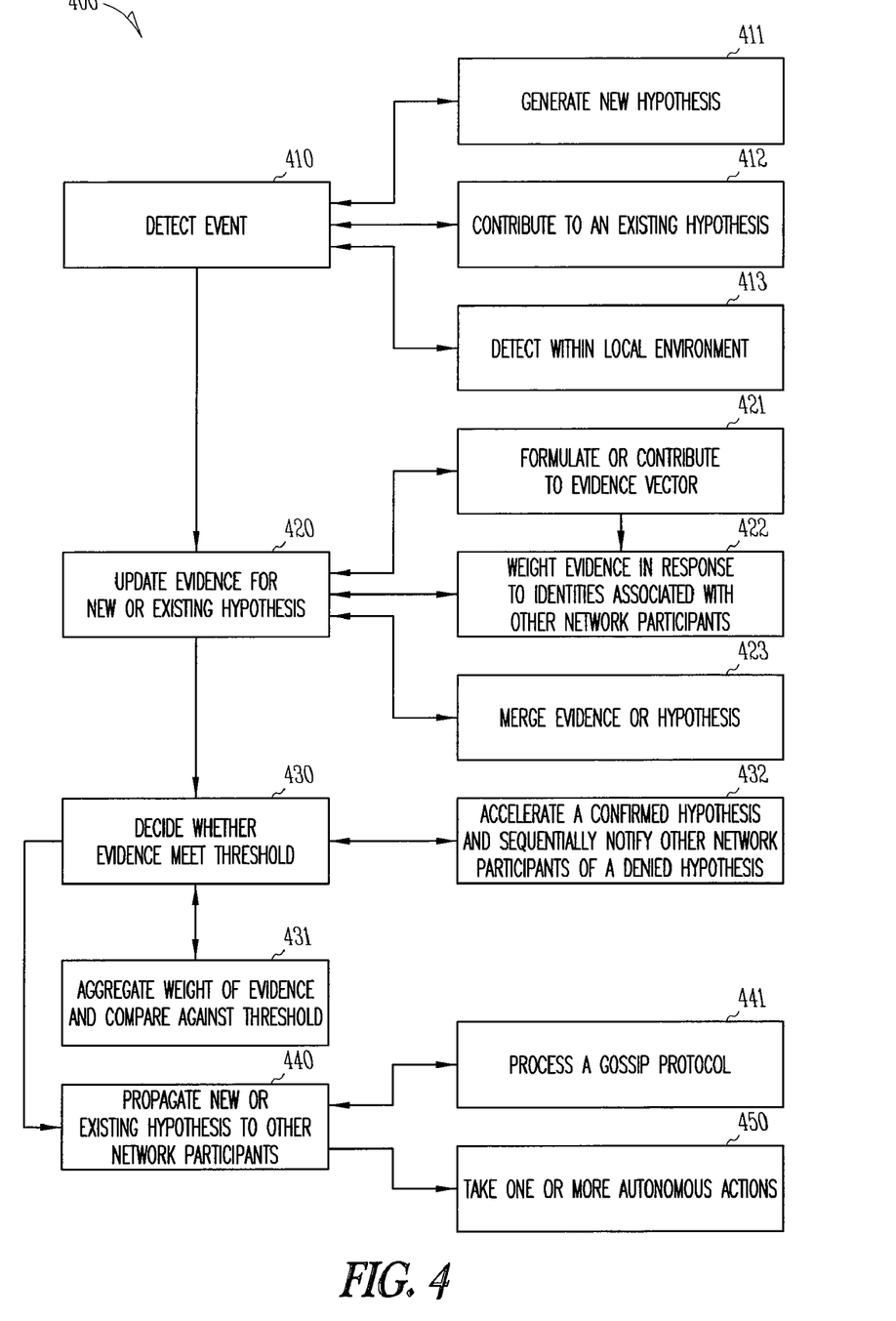
FIG. 4 is diagram of a method to distribute and contribute to a hypothesis about a resource over network to network participants, according to an example embodiment.

FIG. 4 is diagram of a method 400 to distribute and contribute to a hypothesis about a resource over network-to-network participants, according to an example embodiment. The method 400 (hereinafter "problem detection service") is implemented in a machine-accessible and readable medium and is operational over a network. The problem detection service presents a different perspective of the method 200 presented above with respect to FIG. 2. Instances of the problem detection service are implemented on machines or nodes of the network and are adapted to communicate with one another. In an embodiment, this communication includes a node's confusion matrix and an evidence vector and hypothesis (H).

At 410, the problem detection service detects an event and gathers metadata associated with the event, such as attributes associated with a resource to which the event relates, like an IP address or an IP prefix, and the like. In an embodiment, at 411, the detected evidence may be used by the problem detection service to generate a new or independent H about the resource A. The generated H may be independent of any detected event. In other cases, at 412, the problem detection service may be detecting or trapping the event with respect to A in response to a received H from another network participant. Thus, at 412, the problem detection service may contribute to an existing H. At 413, the event is detected within the local environment of the problem detection service.

The problem detection service may take some form of action in response to the hypothesis even before an event or evidence is confirmed. For example, the problem detection service may, in response to a new or existing H rate-limit traffic associated with the resource.

At 420, the detected event is processed to update evidence about the new H or existing H. In an embodiment, at 421, the evidence may be concatenated into a string that forms an evidence vector Y. Y includes identities for each contributing network participant, the identity of A, and numeric values for each piece of evidence, such as 1 for positive evidence, 0 for no evidence, and −1 for negative evidence.

In an embodiment, at 422, the problem detection service may use a network participant's confusion matrix to weight the evidence included within Y that accompanies the H. This may be done in a variety of fashions in response to the identity of the contributing network participants to Y.

According to an embodiment, at 423, the problem detection service may determine that it has received multiple Y's with respect to A (a given resource). In such a case, the problem detection service may merge the multiple Y's into a single Y. In a similar manner, the problem detection service may determine that it has received multiple H's with respect to A. In such a situation, the problem detection service may merge the multiple H's into a single H. Techniques for merging multiple Y's and H's were presented above with respect to the discussion of the method 200 of FIG. 2.

At 430, the problem detection service decides whether it can confirm H as a TRUE or deny H as a FALSE. Techniques and alternative approaches for achieving this were discussed above with respect to the method 200 of FIG. 2. One such technique where the evidence about H from each of the network participants is given equal weight (implying that the confusion matrixes of the network participants are the same) is to sum the evidence or aggregate the weight of the evidence, at 431, and compare the weight of the evidence against the threshold. If this results in a confirmed or a denied hypothesis, then, at 432, the problem detection service may accelerate an alarm condition or dampen a clear condition about the network to the other network participants.

Assuming the hypothesis value was not determined by the problem detection service, at 440, the problem detection service propagates the updated H or new H and local evidence it added to other network participants. In an embodiment, the problem detection service may propagate the new H or existing H and the updated evidence to the other network participants via a gossip protocol.

If the hypothesis value was not determined by the problem detection service, then, at 450, the problem detection service may still take one or more configured and autonomous actions in response to the new or existing H.

Figure 5:
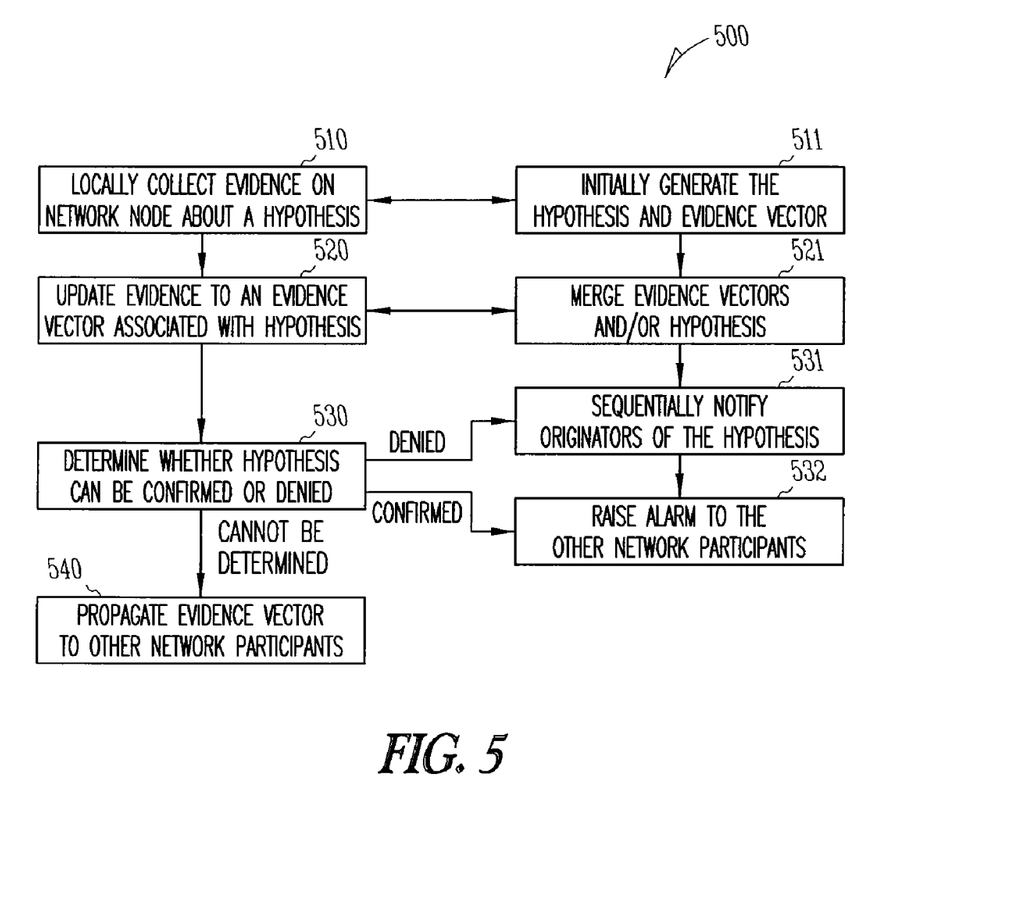
FIG. 5 is a diagram of another method to distribute and contribute to a hypothesis about a resource over network to network participants, according to an example embodiment.

FIG. 5 is a diagram of another method 500 to distribute and contribute to a hypothesis about a resource over network to network participants, according to an example embodiment. The method 500 is implemented as instructions in a machine-accessible and readable medium and is operational over a network. The instructions when loaded and processed by a machine perform the processing depicted in FIG. 5.

The instructions may be implemented in removable media that when interfaced and uploaded to a machine perform the method 500. Alternatively, the instructions may be prefabricated within memory and/or storage of a machine and when initiated perform the method 500. In still other cases, the instructions may be downloaded from one machine on the network and processed. In still other arrangements, the instructions may reside on a remote machine of the network and initiated and processed at the direction of another machine of that network.

At 510, the instructions locally collect evidence on a network node about a hypothesis H, where the evidence is represented as an evidence vector. Examples of H's and evidence vectors Y's were presented above with respect to FIGS. 1 and 2. In some cases, at 511, the instructions initially and independently generate the H and Y.

At 520, the locally collected evidence is used to update Y associated with H. In some situations, at 521, multiple Y's and/or H's may have been detected by the instructions. In such a case, the instructions may merge multiple Y's to a single Y and merge multiple H's to a single H.

At 530, the instructions determine in response to the updated Y whether the H can be affirmatively confirmed or denied. If H is denied, then, at 531, the instructions sequentially notify any originators of the H. The other network participants may elect to ignore a denied H or based on the identity of the service representing the instructions decide on how much weight should be provided to the denied H. Also, the other network participants may undo previous actions that they may have taken when an H is denied. For example, if a particular network participant had rate-limited traffic associated with the resource when the H was initially generated or discovered, then the particular network participant may elect to re-establish normal network traffic for the resource after H is denied.

However, if H is confirmed, then, at 532, the instructions may raise an alarm to the other network participants. The other network participants may use the alarm to take any configured or desired evasive action in response to the alarm. That is, each network participant may have its own procedures or actions that are independent of the remaining network participants, which are taken in response to the raised alarm. Additionally, each network participant may be configured to process the alarm in a different manner.

For example, one network participant may wait to receive more than one alarm from multiple other network participants before it accepts the alarm as legitimate. Another network participant may use the identity of the participant sending an alarm to provide more or less weight to a raised alarm. A variety of configurations are possible with respect to taking action or taking no action for a raised alarm or plurality of alarms. All such configurations are intended to fall within the embodiments of this invention. Each participant takes actions that it feels are appropriate independent of the other network participants. Furthermore, notification of the alarm or a denied H may occur via any message passing mechanism or a gossip protocol as described herein.

If, at 540, H cannot neither be confirmed nor denied, then the instructions propagate H and Y to the other network participants. In an embodiment, the instructions may use a gossip protocol to effectuate the propagation about H and Y to the other network participants.

Figure 6:
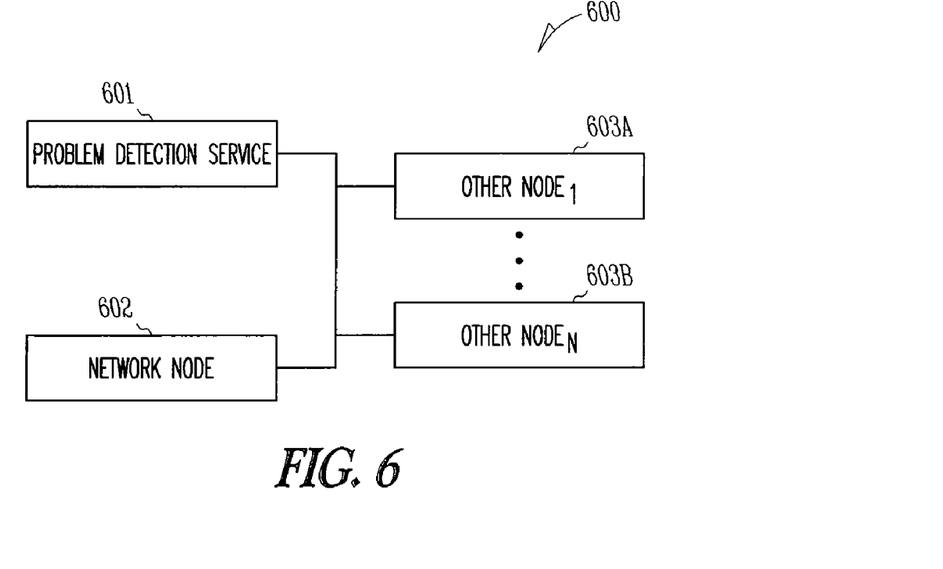
FIG. 6 is a diagram of a distributed hypothesis propagation apparatus, according to an example embodiment.

FIG. 6 is a diagram of a distributed hypothesis propagation apparatus 600, according to an example embodiment. The distributed hypothesis propagation apparatus 600 is implemented in a machine-accessible and readable medium and is operational over a network. The distributed hypothesis propagation apparatus 600 implements, among other things, the methods 200, 400, and 500 of FIGS. 2, 4, and 5, respectively.

The distributed hypothesis propagation apparatus 600 includes a problem detection service 601 and a network node 602. The distributed hypothesis propagation apparatus 600 also interacts with one or more other nodes 603A and 603B over a network, each of which may include problem detection services. The network may be wired, wireless, or a combination of wired and wireless. Each of these will now be discussed in turn.

The problem detection service 601 operates within a local network environment of the network node 602. In an embodiment, the problem detection service 601 processes on a switch or node associated with a network device of the network node 602. In another embodiment, the problem detection service 601 processes on the machine associated with the network node 602 or that represents the network node 602.

The problem detection service 601 communicates with other instances of the problem detection service 601 that process on the other network nodes 603A and 603B. The problem detection service 601 generates hypotheses about resources A's and contributes to evidence vectors associated with other hypotheses generated by the other network nodes 603A and 603B and received by the problem detection service 601. This is done by detecting events associated with A and forming values that represent evidence. Evidence gathers for a given H about a given A to form evidence vectors. The evidence vectors are evaluated using techniques presented above to determine whether a given H can be confirmed, denied, or neither confirmed nor denied. A confirmation is accelerated over the network to the other network nodes 603A and 603B. A denial is dampened over the network to the other network nodes 603A and 603B. In other cases, the H and Y are propagated to the other network nodes 603A and 603B once the problem detection service 601 updates Y with its locally collected evidence about A. Techniques for achieving these operating scenarios were presented above.

The network node 602 is a device or is a machine that houses or communicates with the problem detection service 601. It is the system or machine that a resource is attempting to connect to or that resource is already processing on.

The other network nodes 603A and 603B are similarly configured as the distributed hypothesis propagation apparatus 600 and are operational to communicate with the distributed hypothesis propagation apparatus 600 over the network. The communications include H's, Y's, and in some cases confusion matrixes associated with each network node 603A and 603B.

The distributed hypothesis propagation apparatus 600 provides a mechanism for achieving distributed H testing in autonomic machines over a network. H can be about attacks, performance issues, configuration issues, or security issues that are associated with A's that are either processing on the network node 602 or attempting to remotely connect to the network node 602.

Figure 7:
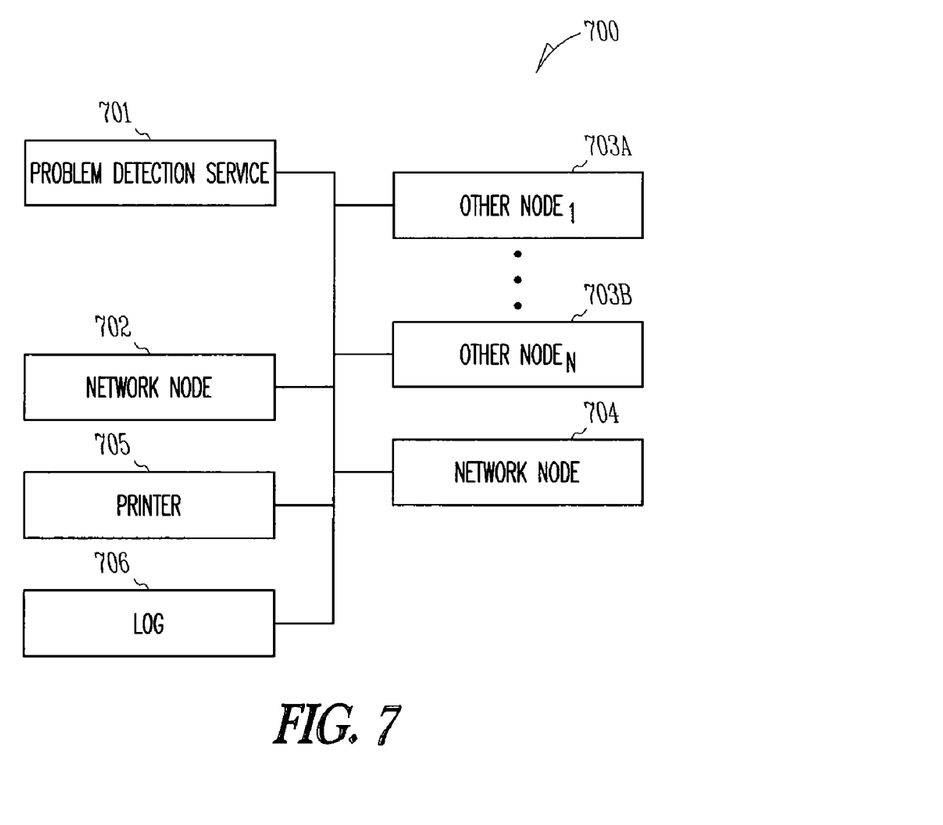
FIG. 7 is a diagram of a distributed hypothesis propagation system, according to an example embodiment.

FIG. 7 is a diagram of a distributed hypothesis propagation system 700, according to an example embodiment. The distributed hypothesis propagation system 700 is implemented in a machine-accessible and readable medium and is operational over a network. The distributed hypothesis propagation system 700 includes the distributed hypothesis propagation apparatus 600 of FIG. 6 and adds a few additional components.

The distributed hypothesis propagation system 700 includes a problem detection service 701, a network node 702, and a display 704. In some embodiments, the distributed hypothesis propagation system 700 may also include a printer 705 and a log 706. The problem detection service 701 communicates over a network with one or more other nodes 703A and 703B for purposes of distributing evidence about a given H associated with a given resource A.

The operation of the problem detection service 701 and the network node 702 and the other nodes 703A and 703B were discussed in detail above with the distributed hypothesis propagation apparatus 600 of FIG. 6. The display 704 presents information associated with H, the evidence, the contributed evidence provided by the other nodes 703A and 703B, the problem detection service 701, the network node 702, the network resource (A), or the other network nodes 703A and 703B. This allows for the performance of the distributed hypothesis propagation system 700 to be monitored, analyzed, and enhanced.

In an embodiment, the distributed hypothesis propagation system 700 also includes a printer 705 to print the information that the display 704 is capable of presented. In still another embodiment, the distributed hypothesis propagation system 700 includes a log to record or house the information.

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter may lie in less than all features of a single disclosed embodiment. Thus the following claims are hereby incorporated into the Description of the Embodiments, with each claim standing on its own as a separate exemplary embodiment.

What is claimed is:

1. A machine-implemented method, comprising:
   detecting an event and determining whether the event contributes to an existing hypothesis about a network resource or if the event warrants a new hypothesis;
   updating collaborative evidence associated with the existing hypothesis or the new hypothesis in response to the event;
   deciding whether the evidence meets a threshold for confirming a problem with the network resource or denying the problem with the network resource; and
   propagating the existing hypothesis or the new hypothesis along with the updated evidence to one or more other network participants, wherein the existing hypothesis or the new hypothesis is represented as a message that includes an identity of a detector for the event, an identity of the network resource, and the updated evidence, the updated evidence including a positive value when the updated evidence confirms the hypothesis and a negative value when the updated evidence contradicts the hypothesis, and wherein the message is sent to the one or more network participants, the detector also has an associated sensitivity that is an accuracy profile for the detector in identifying the problem, the sensitivity is equal to a total number of true positive problems identified by the detector divided by a sum comprising the total number of the true positives problems plus a total number of false negative problems identified by the detector, and wherein the sensitivity is derived from a confusion matrix that is a table of properties representing an ability of the detector to detect previous problems.

2. The method of claim 1, wherein updating further includes at least one of:
   formulating or contributing to a new evidence vector associated with the new hypothesis; and
   incrementally contributing to an existing evidence vector associated with the existing hypothesis.

3. The method of claim 2, wherein deciding further includes:
   aggregating a weight of the evidence vector to acquire a summed value; and
   comparing the weight of the evidence against the threshold to decide whether to confirm or deny the existing hypothesis or the new hypothesis.

4. The method of claim 2 further comprising:
   weighting some portions of the evidence associated with the evidence vector differently in response to identities associated with the one or more other network participants; and comparing the weight of the evidence against the threshold to decide whether to confirm or deny the existing hypothesis or the new hypothesis.

5. The method of claim 1 further comprising, generating the new hypothesis independent of the event.

6. The method of claim 1 further comprising, taking one or more autonomous actions in response to existing hypothesis or the new hypothesis.

7. The method of claim 1, wherein detecting further includes identifying the event within a local environment of a network node.

8. The method of claim 1 further comprising at least one of:
merging evidence received which is associated with a same hypothesis and which is partially duplicated if received from multiple ones of the one or more other network participants;
merging the new hypothesis with the existing hypothesis if related to the same hypothesis;
propagating the evidence and the new hypothesis or the existing hypothesis to the one or more other network participants;
accelerating the propagation or raising an alarm to the one or more other network participants if the existing of new hypothesis is confirmed; and
sequentially notifying originators of and/or contributors to the existing hypothesis, if the existing hypothesis is denied.

9. A machine-accessible medium stores associated instructions, which when processed, result in a machine performing:
locally collecting evidence on a network node about a hypothesis;
updating the evidence to an evidence vector associated with the hypothesis, wherein the evidence vector includes an identity for a detector of an event that led to the collection of the evidence, an identity for the network node, and the evidence, and wherein the evidence includes negative evidence that contradicts the hypothesis, which is represented as a negative value within the hypothesis, or the hypothesis includes positive evidence that confirms the hypothesis, which is represented as a positive value within the hypothesis, the detector also has an associated sensitivity that is an accuracy profile for the detector in identifying a problem, the sensitivity is equal to a total number of true positive problems identified by the detector divided by a sum comprising the total number of the true positives problems plus a total number of false negative problems identified by the detector, and wherein the sensitivity is derived from a confusion matrix that is a table of properties representing an ability of the detector to detect previous problems;
determining whether the hypothesis can be confirmed or denied; and
propagating the evidence vector to other network participants over a network, if the hypothesis is neither confirmable nor deniable.

10. The medium of claim 9, further including instructions to sequentially notify one or more originators of and/or contributors to the hypothesis if the evidence and the evidence vector deny the hypothesis.

11. The medium of claim 10, further including instructions to merge the evidence vector with another evidence vector is both of the vectors are associated with the same hypothesis.

12. The medium of claim 10, further including instructions to combine two separate hypotheses into the hypothesis if the two separate hypotheses are related or the same.

13. The medium of claim 9, further including instructions to initially generate the hypothesis and the evidence vector.

14. The medium of claim 13, further including instructions to raise an alarm that is communicated to the one or more other network participants if the evidence and the evidence vector confirm the hypothesis.

15. An apparatus, comprising:
a network node; and
a problem detection service to process within a local environment of the network node, wherein the problem detection service is to generate or to contribute to a hypothesis associated with a network resource and wherein the problem detection service is to propagate the evidence and contributed evidence, which is locally resolved on the network node, over a network to other network nodes, and wherein the problem detection service represents the hypothesis as an identity for the problem detection service, an identity for the network resource, and the evidence, and wherein the evidence is a positive value when it confirms the hypothesis and is a negative value when it contradicts the hypothesis, the problem detection service also has an associated sensitivity that is an accuracy profile for the problem diction service in identifying a problem, the sensitivity is equal to a total number of true positive problems identified by the problem detection service divided by a sum comprising the total number of the true positives problems plus a total number of false negative problems identified by the problem detection service, and wherein the sensitivity is derived from a confusion matrix that is a table of properties representing an ability of the problem detection service to detect previous problems.

16. The apparatus of claim 15, wherein the problem detection service is to propagate the hypothesis and the evidence or the contributed evidence as a vector to the other network nodes via at least one of a gossip protocol and a message passing mechanism.

17. The apparatus of claim 16, wherein the problem detection service is to weight different portions of the vector in response to identities associated with the other network nodes.

18. The apparatus of claim 15, wherein the problem detection service is to merge multiple hypotheses into the hypothesis or is to merge multiple evidence vectors associated with the evidence or the contributed evidence.

19. The apparatus of claim 15, wherein the problem detection service is to aggressively notify the other network nodes of a determination that the hypothesis is true.

20. The apparatus of claim 15, wherein the problem detection service is to process the evidence and the contributed evidence to contribute to a decision as to whether the network resource is at least one of an attacker of the network node, a service using the network node to attack the other network nodes, or an application processing on the network node that fails or has a performance problem.

21. A system, comprising:
a network node;
a problem detection service to process within a local environment of the network node, wherein the problem detection service is to generate or to contribute to a hypothesis associated with a network resource and wherein the problem detection service is to propagate the evidence and contributed evidence, which is locally resolved on the network node, over a network to other network nodes, and wherein the problem detection service represents the hypothesis as an identity for the problem detection service, an identity for the network resource, and the evidence, and wherein the evidence is a positive value when it confirms the hypothesis and is a negative value when it contradicts the hypothesis, the problem detection service also has an associated sensitivity that is an accuracy profile for the problem diction service in identifying a problem, the sensitivity is equal to a total number of true positive problems identified by the problem detection service divided by a sum comprising the total number of the true positives problems plus a total number of false negative problems identified by the problem detection service, and wherein the sensitivity is derived from a confusion matrix that is a table of properties representing an ability of the problem detection service to detect previous problems; and a display to present information associated with the hypothesis, the evidence, the contributed evidence, the problem detection service, the network node, the network resource, or the other network nodes.

22. The system of claim 21 further comprising, a printer to print the information.

23. The system of claim 21 further comprising, a log to record the information.

\* \* \* \* \*